Patented Jan. 24, 1939

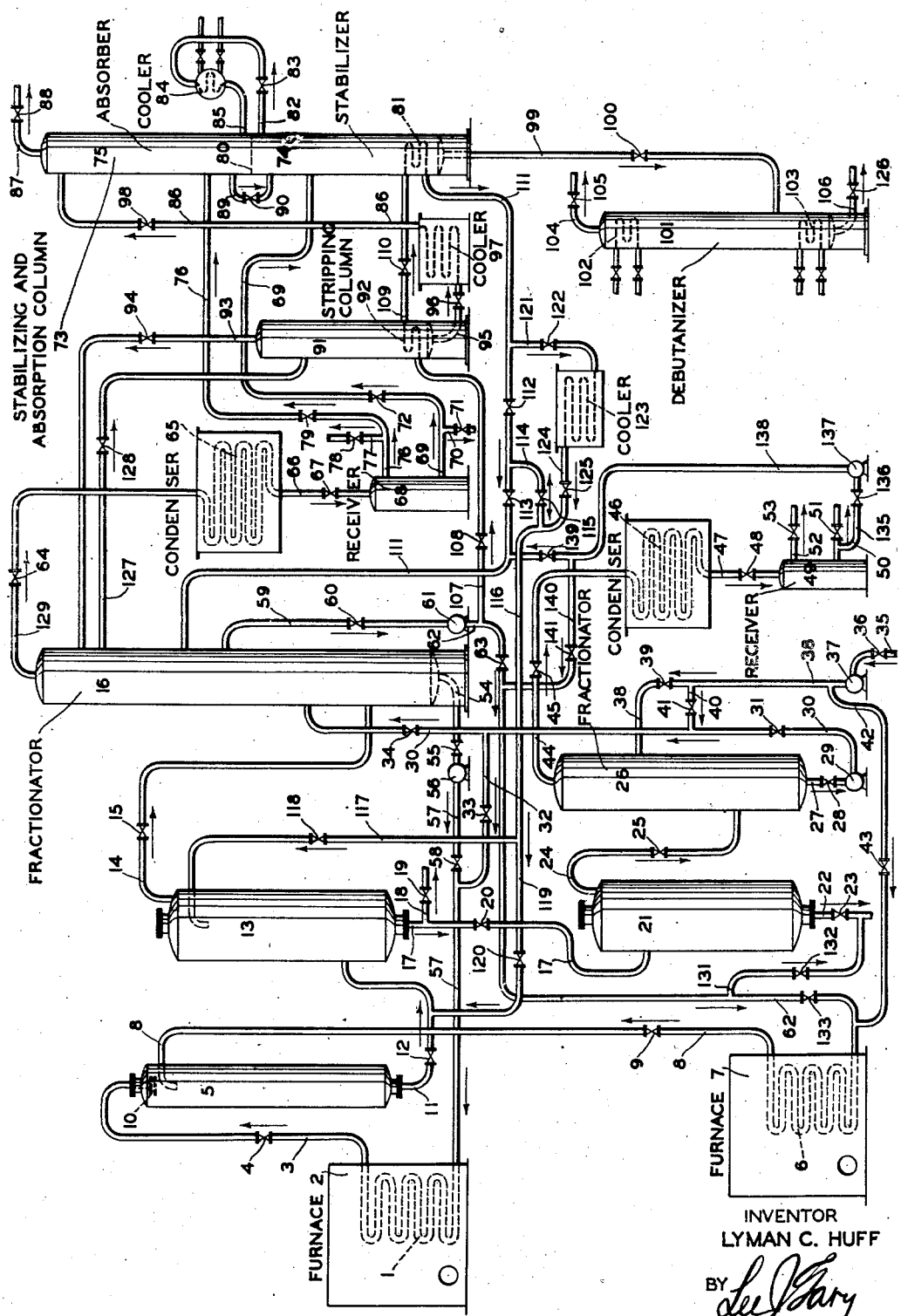

2,144,803

UNITED STATES PATENT OFFICE 2,144,803

CONVERSION OF HYDROCARBON OILS

Lyman C. Huff, Chicago, Ill., assignor to Universal Oil Products Company, Chicago, Ill., a corporation of Delaware Application February 26, 1937, Serial No. 127,886

5 Claims. (Cl. 196—8)

This invention particularly refers to an improved process for the simultaneous conversion of relatively high-boiling hydrocarbon oils under independently controlled cracking conditions, accompanied by two stages of flash distillation for the liquid conversion products, to produce a good quality high-boiling liquid residue, and also accompanied by absorption of the normally gaseous conversion products with selected low-boiling condensate from the fractionating step of the cracking system, to recover desirable high-boiling components of the gases which are blended with the gasoline product, and accompanied by two-stage stabilization of the gasoline produced by the cracking operations, to control its vapor pressure and separately recover gaseous products containing a high percentage of readily polymerizable olefins.

In one specific embodiment, the invention comprises cracking an oil of relatively high-boiling characterteristics, recovered from within the system, as will be later described, at elevated temperature and superatmospheric pressure in a heating coil, simultaneously cracking an oil of relatively low boiling characteristics, recovered from within the system, as will be later described, under independently controlled cracking conditions of elevated temperature and superatmospheric pressure in a separate heating coil, introducing the heated products from both heating coils into an enlarged reaction chamber also maintained at substantial superatmospheric pressure wherein the commingled heated oils, and more particularly their vaporous components, are subjected to appreciable continued cracking, withdrawing both vaporous and liquid conversion products from the reaction chamber in commingled state and introducing the same into a reduced pressure vaporizing and separating chamber wherein further vaporization of the liquid products and separation of vapors and the resultant residual liquid is accomplished, withdrawing said vapors from the vaporizing and separating chamber and subjecting the same to fractionation in a fractionating zone, separately removing said residual liquid from said vaporizing and separating chamber and introducing the same into a flash distilling chamber wherein their further vaporization is effected by further reduction in pressure and wherein the evolved vapors are separated from the final residual liquid product of the process, recovering the latter, subjecting said evolved vapors to fractional condensation in a separate fractionating zone by intimately commingling the same with hydrocarbon oil charging stock for the process, removing the desired uncondensed low-boiling components of said evolved vapors from the last mentioned fractionating zone together with any low-boiling components of the charging stock, of similar characteristics, which are vaporized in the latter zone, condensing the vaporous mixture and recovering the resultant distillate or returning the same to the first mentioned fractionating step and, at least in part, to further cracking within the system, removing non-vaporous components of the charging stock and components of said evolved vapors condensed in the last mentioned fractionating zone therefrom and commingling the same with the said vaporous conversion products undergoing fractionation in the first mentioned fractionating zone, condensing as reflux condensate in the first mentioned fractionating zone components of the commingled material subjected to fractionation therein which boil above the range of the desired final gasoline product of the process, separating said reflux condensate into selected relatively low-boiling and higher boiling fractions, returning the latter, as said oil of relatively high-boiling characteristics, to cracking in the first mentioned heating coil, supplying selected low-boiling fractions of the reflux condensate, as said oil of relatively low-boiling characteristics, to cracking the second mentioned heating coil, removing fractionated vapors, boiling within the range of gasoline, and normally gaseous products from the first mentioned fractionating zone, subjecting the same to condensation, separating the resulting distillate and uncondensed gases, subjecting said distillate to stabilization for the purpose of liberating normally gaseous components therefrom and reducing its vapor pressure, absorbing desirable high-boiling components, such as butane, butene and higher boiling materials, from said uncondensed gases and from the gases liberated from the distillate in a liquid absorber oil comprising selected high-boiling fractions of the desired final gasoline product of the process, commingling the resultant enriched absorber oil with the distillate undergoing said stabilization, removing the resultant distillate from the stabilizing step and subjecting the same to further stabilization in a separate zone for the purpose of liberating therefrom any excessive quantity of normally gaseous products, comprising principally butanes, butenes, and any lower boiling gases recovered in the absorption step, and separately recovering the final stabilized gasoline and the gases liberated therefrom in the last mentioned stabilizing step.

It will, of course, be understood that the invention is not limited to all of the various steps of the process above outlined, in combination. However, many of the various features and steps of the process are cooperative and interdependent, but, depending upon the results desired, some of the features, as well as some of the combinations, may be omitted without destroying the operability and novelty of the process.

The various features of the invention and their cooperative relation will be more apparent with reference to the accompanying diagrammatic drawing and the following description thereof. The drawing illustrates one specific form of apparatus embodying the various features of the invention and in which the process of the invention may be conducted in its various specific embodiments.

Referring to the drawing an oil of relatively high-boiling characteristics recovered from within the system and supplied to heating coil 1, as will be later more fully described, is subjected therein to the desired conversion temperature preferably at a substantial superatmospheric pressure by means of heat supplied from a furnace 2 and the stream of hot conversion products is discharged from the heating coil through line 3 and valve 4 into reaction chamber 5.

Simultaneously an oil of relatively low-boiling characteristics recovered from within the system and supplied to heating coil 6, as will be later described, is subjected therein preferably to a higher conversion temperature than that to which the higher boiling oils supplied to heating coil 1 are subjected. The required heat is supplied to the oil passing through heating coil 6 by means of a furnace 7 and, preferably, a substantial superatmospheric pressure is also maintained in this heating coil, the heated products being discharged through line 8 and valve 9 into reaction chamber 5.

Chamber 5 is also preferably maintained at a substantial superatmospheric pressure, which may be substantially the same or somewhat lower than that employed at the outlet from the communicating heating coil utilizing the lowest pressure. Chamber 5 is also preferably insulated (although insulation is not indicated in the drawing) in order to conserve heat, so that continued conversion of the heated products supplied to that zone, and particularly their vaporous components, is accomplished therein. Preferably, the stream of heated products from heating coil 1, which will normally contain a substantial quantity of relatively high-boiling liquid components, is directed against the interior surface of the walls in the upper portion of chamber 5 by means of a suitable spreader flange or spray arrangement such as indicated at 10, whereby the high-boiling liquid components thus contacted with the walls of the chamber are caused to flow rapidly downwardly therefrom to the lower portion of the chamber, while the vaporous components of the stream of heated products from heating coil 1 commingle in the upper portion of the chamber with the stream of heated products from heating coil 6, the commingled materials passing downward through the vapor space in the reaction chamber to its lower portion and being subjected during their passage therethrough to appreciable further conversion.

In the case here illustrated, both vaporous and liquid conversion products are withdrawn in commingled state from the lower portion of the reaction chamber and are directed through line 11 and valve 12 into the lower portion of vaporizing chamber 13. It is, of course, also within the scope of the invention to separate vaporous and liquid conversion products in chamber 5, in which case the liquid products, either alone or together with a regulated portion of the vapors, may be supplied to chamber 13 in the manner illustrated, while vaporous products separately withdrawn from any desired point or plurality of points in the reaction chamber are separately supplied to either chamber 13 at any desired point therein, by well known means, not illustrated or to fractionator 16, or in part to both chamber 13 and fractionator 16.

The reduced pressure employed in chamber 13, relative to that utilized in chamber 5, serves to effect further vaporization of the liqpid conversion products supplied to this zone and separation of vaporous and resultant non-vaporous liquid conversion products is accomplished in chamber 13. Preferably, although chamber 13 utilizes a substantially lower pressure than the reaction chamber, a substantial superatmospheric pressure is maintained in chamber 13. The vapors evolved in chamber 13 as well as any vaporous products supplied to this zone from chamber 5 are directed from the upper portion thereof through line 14 and valve 15 to fractionation in fractionator 16, the liquid products remaining unvaporized in chamber 13 are withdrawn from the lower portion of this zone through line 17 and may be removed, all or in part, from the system through line 18 and valve 19 to cooling and storage, or elsewhere as desired. Preferably, however, a substantial portion or all of this material is directed through valve 20 in line 17 to flash distilling chamber 21 wherein its appreciable further vaporization is effected by employing a substantially reduced pressure in this zone relative to that utilized in chamber 13.

The further vaporization thus effected in chamber 21 leaves a high-boiling liquid residue from which substantially all of the relatively low-boiling components, suitable for further cracking within the system to produce additional yields of gasoline, have been removed. The liquid residue remaining unvaporized in chamber 21 is withdrawn from the lower portion thereof through line 22 and valve 23 to cooling and storage or elsewhere as desired and, when desired, to more accurately control the characteristics of this product, particularly with respect to flash point and viscosity, regulated quantities of selected low-boiling fractions of the intermediate liquid products of the process, preferably comprising a selected low-boiling fraction of the reflux condensate from fractionator 16 may be blended with the residual liquid withdrawn from chamber 21. This reflux condensate, as will be apparent from subsequent description of the drawing, may or may not contain charging stock or selected fractions thereof. To illustrate one specific means for accomplishing this blending of relatively light oil with the residual liquid line 131 containing valve 132 and communicating with lines 62 and 22 is provided in the case here illustrated, whereby the selected low-boiling fractions of the reflux condensate formed in fractionator 16 and directed, as will be later more fully described, through line 62 to conversion in heating coil 6, may be diverted in regulated quantities from line 62 and blended with the residual liquid withdrawn from chamber 21. It is, of course, also within the scope of the invention to provide separate means of any well known form, not illustrated, for commingling any selected fractions of the reflux condensate from fractionator 16 with the residual liquid withdrawn from chamber 21, so that the low-boiling blending oil need not necessarily comprise material of the same characteristics as that supplied from fractionator 16 to heating coil 6.

I have found that two stages of flash distillation for the liquid conversion products, as herein provided, are particularly advantageous in a cracking system of this type, since, by their use, I am able to obtain a flashed residue of the desired quality without employing excessively low pressure in the initial flash distilling and separating zone, corresponding in the present case to chamber 13. The use of higher pressure in chamber 13 than that which could normally be employed to obtain residual liquid of the desired quality without the subsequent flashing step, permits the use of higher pressure in the succeeding fractionator 16 which, in turn facilitates the use of substantial superatmospheric pressure in the succeeding condensing, collecting and separating equipment, to which fractionated vapors and normally gaseous products from this fractionator are supplied, as well as in the first stabilizing step and in the absorber. By this method of operation, in conjunction with the use of two stabilization steps and the use of an absorber oil which may be blended with the stabilized distillate without contaminating the same, selected relatively high-boiling components of the gaseous products of the process may be concentrated in the distillate removed from the first stabilizing step and the excess of such gases so concentrated in the distillate may be subsequently removed therefrom by further stabilization or flash distillation of the same in a second stabilizing step. Thus low-boiling gases, such as those which are not readily polymerizable by present efficient methods, may be removed from the absorption step while higher boiling gases, containing a high concentration of readily polymerizable olefins, and a distillate product, stabilized at the desired vapor pressure, may be separately recovered from the second stabilizing step. Thus a fairly large amount of high-boiling gases, such as butanes and butylenes, for example, may be included in the final stabilized distillate, increasing the yield of this product without excessively increasing its vapor pressure and the ramaining high-boiling readily polymerizable gases may be segregated from lower boiling and less readily polymerized gases to provide a good gaseous charging stock for catalytic polymerization.

In order to avoid the necessity of employing a vapor pump, or utilizing substantially the same or lower pressure in fractionator 16 than that employed in chamber 21, the vapors evolved in the latter zone, which are ordinarily composed principally of materials boiling within the range of heavy reflux condensate which it is desired to crack in heating coil 1, are directed from the upper portion of chamber 21 through line 24 and valve 25 to fractionation in a separate fractionating column 26, preferably operated at substantially the same or somewhat lower pressure than that employed in chamber 21. The high-boiling components of these vapors are condensed as reflux condensate in fractionator 26 and directed from the lower portion of this zone through line 27 and valve 28 to pump 29, wherefrom they are fed through line 30 and valve 31 and may be directed either through line 32, valve 33 and line 57 to heating coil 1, for further cracking, or they may be supplied, all or in part, through valve 34 in line 30 to fractionator 16, entering this zone at any desired point or plurality of points therein but preferably below the point from which the low-boiling condensate supplied to heating coil 6 is removed.

Hydrocarbon oil charging stock for the process is directed from any desired source through line 35 and valve 36 to pump 37 by means of which it is fed through line 38 and may, in the particular case here illustrated, be directed, all or in part, through valve 39 in this line into fractionator 26 to commingle therein with the vaporous products from chamber 21 undergoing fractionation therein, serving particularly to cool the vapors and assist their fractionation and being subjected to partial vaporization and fractionation therewith. This method of supplying the charging stock to the system is ordinarily desirable when employing a charging stock of relatively high-boiling characteristics or even with charging stocks of relatively wide boiling range, when the latter do not contain too great a proportion of low-boiling fractions suitable for cracking in heating coil 6. This operation is still permissible, although not so advantageous, with practically any type of charging stock, but, in case it is not desired, provision is made for supplying a portion or all of the charging stock direct to fractionator 16 by means of line 40 and valve 41, communicating with lines 38 and 30, or charging stock supplied to line 30 in this manner may, when desired, be directed to heating coil 1, together with reflux condensate from fractionator 26, through line 32, valve 33 and line 57. Provision is also made, in case the charging stock is an oil of relatively low-boiling characteristics suitable for conversion in heating coil 6, for directing the same from line 38 through line 42 and valve 43 direct to heating coil 6.

Fractionated vapors of the desired end-boiling point, regulated to suit requirements, and which may comprise for example, any or all materials such as good quality gasoline or gasoline fractions, naphtha, kerosene or kerosene distillate, Diesel fuel, furnace distillate, gas oil, or the like, contained in the materials supplied to fractionator 26, are removed together with normally gaseous products from the upper portion of this zone and directed through line 44 and valve 45 to condensation and cooling in condenser 46, the resulting distillate and uncondensed gases pass through line 47 and valve 48 to collection and separation in receiver 49. The distillate may be withdrawn from the receiver through line 50 and valve 51 to storage or to any desired further treatment, or it may be supplied, all or in part, to fractionator 16 by means of line 135, valve 136, pump 137, line 138, valve 139, line 111 and/or to heating coil 6 through line 140, valve 141 and line 62. Uncondensed gases may be released from receiver 49 through line 52 and valve 53 and may, when desired, be directed by well known means, not illustrated, to absorption in the upper portion 75 of column 73, together with gases from receiver 68 which are directed to this zone, as will be later described.

It is, of course, understood that when the charging stock is directed, as previously described, to fractionator 26 and contains relatively low-boiling components which it is desirable to recover without subjecting the same to cracking, such components may be included in, or may comprise the total distillate collected in receiver 49. Therefore, the use of the secondary flashing step and separate fractionating equipment for the hot vaporous products from this zone has the additional advantage of permitting topping of the charging stock and the recovery of desirable low-boiling fractions therefrom without commingling the same with the cracked products recovered from fractionator 16.

The vaporous conversion products supplied to fractionator 16, as previously described, commingle in this zone with any reflux condensate from fractionator 26 and/or any charging stock or components thereof supplied to the fractionator as described and the commingled materials are fractionated to recover therefrom low-boiling components within the range of the desired cracked gasoline product of the process, while higher boiling components of the commingled materials are condensed as reflux condensate or may remain, in part, unvaporized in the fractionator. This reflux condensate is separated into selected relatively high-boiling and low-boiling fractions, the latter being removed from the lower portion of the fractionator through line 54 and directed through valve 55 in this line to pump 56, whereby they are supplied through line 57 and valve 58 to conversion in heating coil 1.

Selected low-boiling fractions of the reflux condensate are removed from one or a plurality of suitable intermediate points in the fractionator and, are directed through line 59 and valve 60 to pump 61 by means of which they are supplied, all or in part, through line 62 and valve 63 and valve 133 to conversion in heating coil 6. Regulated quantities of this same material may, when desired, be blended with the residual liquid product removed from chamber 21. Specific means for accomplishing this have been previously described. It is, of course, within the scope of the invention to supply the low-boiling reflux condensate to a suitable reboiling or stripping column, not illustrated, wherein it may be freed of fractions within the boiling range of the desired final gasoline product of the process as well as any entrained or dissolved gases, such low-boiling fractions being preferably returned to fractionator 16.

Fractionated vapors of the desired end-boiling point, preferably comprising materials boiling within the range of gasoline, are removed together with normally gaseous products from the upper portion of fractionator 16 and directed through line 129 and valve 64 to condensation and cooling in condenser 65, the resulting distillate and uncondensed gases pass through line 66 and valve 67 to collection and separation in receiver 68. Distillate withdrawn from receiver 68 through line 69 may be removed, all or in part, from the system through line 70 and valve 71 to storage or to any desired further treatment, but preferably is directed through valve 72 in line 69 to the lower portion 74 of column 73, wherein it is subjected to stabilization, as will be later described. Uncondensed gases are released from receiver 68 through line 76 and may be removed, all or in part, from the system to storage or elsewhere as desired through line 77 and valve 78, but preferably are directed, at least in part, through valve 79 in line 76 to the upper portion 75 in column 73 wherein they are subjected to absorption, as will be later described.

When desired, regulated quantities of the distillate collected in receiver 68 may be recirculated, by well known means, not illustrated in the drawing, to the upper portion of fractionator 16 to serve as a refluxing and cooling medium in this zone. It is also within the scope of the invention to return regulated quantities of the distillate collected in receiver 49 to the upper portion of fractionator 26 as a cooling reflux medium, although the well known provisions for accomplishing this are not shown in the drawing.

In the particular case here illustrated stabilization of the distillate from receiver 68 and absorption of the gaseous products from receiver 68 and from said stabilization step are accomplished in single column 73, the lower portion of which comprises stabilizer 74 and the upper portion of which comprises absorber 75, the two being separated, in the case here illustrated, by a suitable partition 80. It is, however, entirely within the scope of the invention to employ separate columns for the stabilization and absorption steps. Both the stabilization and absorption zones preferably employ suitable contacting and fractionating means, such as bubble trays, perforated pans, or the like, not illustrated, for obtaining intimate contact between the descending liquids and the ascending vapors and gases. The distillate supplied as described, from receiver 68 to stabilizer 74, is subjected to reboiling and partial vaporization in this zone by means of heat supplied, in the particular case here illustrated, to the lower portion of the stabilizer, by circulating a suitable heat carrying medium, as will be later described, through closed coil 81 in this zone. The low-boiling components liberated from a distillate in stabilizer 74 are directed through line 82, valve 83, cooler 84 and line 85 to absorber 75 wherein they are contacted with a descending stream of absorber oil supplied to the upper portion of absorber 75, as will be later described, through line 86. The relatively lean gases from which at least a substantial portion of the butane and butenes and substantially all of any other high boiling components have been removed are released from the upper portion of the absorber through line 87 and valve 88 to storage or elsewhere as desired. The enriched absorber oil is directed from the lower portion of absorber 75 through line 89 and valve 90 into the upper portion of stabilizer 74, wherein it serves as a cooling and refluxing medium and commingles with the distillate supplied to this zone from receiver 68. The absorber oil preferably employed in the present invention comprises selected high boiling fractions of the final gasoline products of the process, which selected fraction may be removed as a side stream from the fractionator 16 at a suitable point in the upper portion of this zone through line 127 and valve 128 to stripping column 91, wherein it is freed of any entrained or dissolved gases as well as low-boiling fractions by means of circulating a suitable heating medium, as will be later described, through closed coil 92 in the lower portion of this zone. The vapors and gases evolved from the condensate in column 91 are returned to the upper portion of the fractionator through line 93 and valve 94, the reboiled and stripped condensate is directed from the lower portion of column 91 through line 95 and valve 96 and preferably through a suitable cooler 97 wherefrom it is directed through line 86 and valve 98 to the upper portion of absorber 75.

By utilizing an absorber oil of the type mentioned, which is substantially free of butanes, butenes and lower boiling materials and hence capable of absorbing a substantial volume of the high boiling components of the gases, such as butanes and butenes, which are desirable as components of the final gasoline product, only relatively lean gases substantially freed of these materials are removed as described from the upper portion of absorber 75 and, by utilizing an absorber oil boiling within the range of the final gasoline product, the enriched absorber oil may be blended back with the distillate undergoing stabilization in stabilizer 74, as previously described, without contaminating the same. Thus, by the cooperative relation between the stabilizing and absorption steps and by the use of this particular type of absorber oil, I am able to maintain a relatively high concentration of desirable normally gaseous components, such as butane and butenes in the stabilized distillate removed from stabilizer 74 and leave substantially all of the lower boiling normally gaseous products in the lean gases removed from the upper portion of the absorber. This is a distinct and advantageous departure from the usual methods of absorption and stabilization which, in most cases, involve redistillation of the absorber oil to revaporize and to recover the absorbed gases and permit re-use of the lean absorber oil. The previous preferred practice, as applied to cracking systems, has been to return the enriched absorber oil to the fractionator, wherein the absorbed gases are liberated, thus increasing the concentration of such gases in the overhead distillate products from the fractionator and eventually establishing equilibrium conditions between the fractionating, absorbing and stabilizing steps. This recycling increases the load upon each of the steps involved, including the condensation step, by increasing the volume of materials which must be handled in a given time in each of the zones. In the present process, equilibrium conditions are established between the stabilization and absorption steps and without recycling between the absorber and fractionator.

Since the maximum vapor pressure for a good quality gasoline is in most cases from 8 to 12 pounds per square inch (by the Reid method) and since the volume of butanes and butenes produced in most modern cracking operations is too great to include the total amount produced in the gasoline product of the same operation without exceeding this vapor pressure, the present invention provides a secondary stabilizing or debutanizing step whereby accurate control of the butane and butene content and the vapor pressure of the stabilized gasoline may be obtained. This is accomplished by removing the stabilized product, containing substantially all of the butane-butene fractions, from the lower portion of stabilizer 74 and directing the same through line 99 and valve 100 to the debutanizer 101, which is preferably operated at a substantially reduced pressure relative to that employed in stabilizer 74, by means of which vaporization of low-boiling components of the distillate is accomplished. Debutanizer 101 usually contains suitable contacting and fractionating means such as bubble trays, perforated pans or the like, not illustrated, and cooling means such as, for example, a closed coil 102, through which any suitable cooling medium may be circulated, are preferably employed in the upper portion of this zone. Heating or reboiling means such as, for example, a closed coil 103 through which any suitable heating medium may be circulated, may, when desired, be employed in the lower portion of the debutanizer, although normally the reduction in pressure between stabilizer 74 and debutanizer 101 will accomplish sufficient vaporization of the distillate without reheating. The excess gases liberated from the distillate in the butanizer 101 are released from the upper portion of this zone through line 104 and valve 105 to storage or elsewhere as desired, the final stabilized gasoline is removed from the lower portion of the debutanizer through line 106 and valve 126 to cooling and storage or to any desired further treatment.

By employing a secondary stabilizing or debutanizing step in conjunction with the cooperative primary stabilization and absorption steps, I am able to employ a fairly high pressure in the latter zones, whereby to assist absorption of the desired gases and to concentrate substantially all of the butane-butene fractions in the distillate removed from the primary stabilization step, then by releasing or substantially reducing the pressure and by controllable cooling and partially condensing the evolved materials in the final stabilization step, accurate regulation of the vapor pressure of the final gasoline products is obtained. Furthermore, this improved method of stabilization and absorption is particularly desirable in case selected fractions of the gaseous products of the cracking operation, such as butenes or propenes and butenes, are utilized as charging stock for a polymerization process, since, by this method it is possible to concentrate substantially all of the such materials in the distillate recovered from the primary stabilizer and to remove from the secondary stabilizer, a gaseous product having a high concentration of readily polymerizable olefins, while substantially only lower boiling gases unsuitable for catalytic polymerization are removed from the absorber.

Although it is within the scope of the invention to utilize any desired method and means of stripping the condensate supplied to column 91 and the distillate supplied to stabilizer 74, only one method and means is shown in the drawing for the sake of illustration. This comprises diverting regulated quantities of the relatively hot low-boiling reflux condensate, which is removed from fractionator 16 as previously described, from line 62 into line 107, wherefrom it may be circulated to coil 92 in column 91 by means of line 107, valve 108, line 109 and valve 110 and thence through coil 81 in stabilizer 74, wherefrom it is directed through line 111 and may be returned to the fractionator through valves 112 and 113 in this line. Provision is also made for utilizing this material as a cooling oil in line 11 and/or the upper portion of chamber 13. This may be accomplished by directing all or a regulated portion thereof from line 111 through line 114 and valve 115 into line 116 wherefrom it may be supplied through line 117 and valve 118 into the upper portion of chamber 13 and/or through line 119 and valve 120 into line 11 or, preferably, the oil is cooled prior to its use in line 11 or chamber 13 by passing the same from line 111 through line 121, valve 122, cooler 123, line 124 and valve 125 into line 116. That portion, if any, of this material returned to fractionator 16, may also be cooled in cooler 123, when desired, in which case it is passed from line 124 through line 114 and valve 115, back into line 111 and thence to the fractionator. Although not indicated in the drawing, parallel, instead of series-flow, through coils 92 and 81 may be employed, when desired, or either or both of these coils may be by-passed by the stream of heavy, relatively hot reflux condensate and any other suitable heating medium employed, either in coil 91 or in stabilizer 74, or both.

The preferred range of operating conditions which may be employed, in an apparatus such as illustrated and above described, to accomplish the desired results may be approximately as follows: The relatively heavy oil cracking coil may employ an outlet conversion temperature ranging for example from 850 to 950° F. preferably with a superatmospheric pressure at this point in this system of from 100 to 500 pounds or thereabouts per square inch. The temperature employed at the outlet from the light oil cracking coil may range, for example from 900 to 1050° F. or thereabouts, preferably with a superatmospheric pressure of from 200 to 800 pounds or more per square inch. The reaction chamber preferably employs a substantial superatmospheric pressure of from 100 to 500 pounds or thereabouts per square inch, but preferably no greater than the pressure employed at the outlet from the communicating heating coil utilized in the lowest pressure. The vaporizing and separating chamber immediately succeeding the reaction chamber preferably utilizes a superatmospheric pressure which is substantially lower than that employed in the reaction chamber and which may range, for example from 75 to 150 pounds or thereabouts per square inch. The pressure employed in the vaporizing and separating chamber may be substantially equalized or somewhat reduced in the succeeding fractionating, condensing and collecting equipment. The flash distilling chamber, wherefrom the final residual liquid is recovered, preferably employs a substantially reduced pressure relative to that utilized in the preceding vaporizing and separating chamber and this reduced pressure may range, for example from 50 pounds or thereabouts per square inch, superatmospheric, down to substantially atmospheric pressure. The succeeding fractionating, condensing and collecting equipment preferably employ substantially the same or somewhat lower pressure than that utilized in the flash distilling chamber. The absorption and stabilizing column preferably employs a substantial superatmospheric pressure which may be substantially the same or somewhat lower than that employed in the preceding receiver or gas separator. The secondary stabilizing or debutanizing column preferably employ a substantially reduced pressure relative to that utilized in the preceding stabilizer, this reduced pressure ranging, for example from 50 pounds or thereabouts per square inch, superatmospheric, down to substantially atmospheric pressure.

As an example of one specific operation of the process, employing as charging stock a Mid-Continent topped crude of approximately 26° A. P. I. gravity which is supplied to the fractionator of the flash distilling step of the process and directed therefrom, together with reflux condensate from this zone, to the lower portion of the main fractionator of the cracking system; having components of the materials introduced into the main fractionator, which heavy components have a gravity of approximately 18° A. P. I. and contain approximately 80% of which heavy components boil up to 740° F. are removed from the lower portion of this zone at a temperature of approximately 755° F. and directed to the heavy oil cracking coil wherein they are heated to temperature of approximately 890° F. with a superatmospheric pressure of 300 pounds per square inch at this point in the system. Selected lower-boiling fractions of the materials supplied to the main fractionator, having a gravity of approximately 24° A. P. I. and an initial boiling point of approximately 416° F. and containing approximately 80% of material boiling up to 524° F., are supplied at approximately 660° F. to the light oil cracking coil wherein they are heated to an outlet conversion temperature of approximately 960° F. at a superatmospheric pressure of about 600 pounds per square inch. A superatmospheric pressure of approximately 300 pounds per square inch is employed in the reaction chamber and this is reduced in the succeeding vaporizing and separating chamber, to which both vaporous and liquid products from the reaction chamber are directed, to approximately 100 pounds per square inch, superatmospheric pressure. Liquid products are directed from the vaporizing and separating chamber to the flash distilling chamber wherein their further vaporization is effected at a superatmospheric pressure of approximately 10 pounds per square inch. This pressure is substantially equalized in the succeeding fractionating, condensing and collecting portions of the flash distilling step. The main fractionator, to which vaporous products from the vaporizing and separating chamber are directed, is operated at a superatmospheric pressure of approximately 100 pounds per square inch. An overstream of fractionated vapors and normally gaseous products is withdrawn from the main fractionator at a temperature of approximately 345° F. and, after being subjected to condensation, the resulting distillate and uncondensed gases are separated in a receiver operated at a superatmospheric pressure of approximately 90 pounds per square inch. Distillate from this receiver is supplied to the lower portion or stabilizing zone of the absorption and stabilizing column and the gaseous products from the receiver are directed to the upper or absorption portion of this column. The reboiled and stripped light sidestream from the fractionator utilized as absorber oil has an initial boiling point of approximately 325° F. and contains only a small amount of materials boiling above 400° F. The absorption and stabilizing column is operated at a superatmospheric pressure of approximately 85 pounds per square inch. Reboiling of the absorber oil in the stripping column and the distillate in the lower portion of the stabilizer is accomplished by their indirect heat exchange with regulated quantities of the same oil as that supplied to the light oil cracking coil and, after said heat exchange and further cooling, regulated quantities of this material are supplied to the upper portion of the vaporizing and separating chamber and to the transfer line between this zone and the reaction chamber. No reheating of the distillate is required in the secondary stabilizer, which is operated at substantially atmospheric pressure. This operation will produce, per barrel of charging stock, approximately 60% of 400° F. end-point gasoline, which is stabilized to a Reid vapor pressure of approximately 10 pounds per square inch and has an octane number of approximately 68 by the motor method, and approximately 32% of good quality residual liquid suitable as fuel, the remaining 8% or thereabouts being chargeable principally to gas and loss.

I claim as my invention:
1. A process for treating the mixture of cracked gasoline vapors and gases produced in the cracking of hydrocarbon oil, which comprises partially condensing said mixture to form a heavy gasoline condensate, subjecting the remaining vapors and gases to further condensation and separating the resultant light gasoline condensate from uncondensed gases, scrubbing the latter with said heavy gasoline condensate to absorb heavier components of the gases in the condensate, combining the thus enriched heavy gasoline condensate with said light gasoline condensate and stabilizing the resultant mixture to the vapor pressure of motor fuel.

2. A process for treating the mixture of cracked gasoline vapors and gases produced in the cracking of hydrocarbon oil, which comprises partially condensing said mixture to form a heavy gasoline condensate, subjecting the remaining vapors and gases to further condensation, thereby forming a light gasoline condensate, stabilizing the latter to liberate entrained and dissolved normally gaseous products therefrom, scrubbing such liberated gaseous products with said heavy gasoline condensate and combining the latter with the light condensate undergoing stabilization, and stabilizing the combined condensates to the vapor pressure of motor fuel.

3. A process for treating the mixture of cracked gasoline vapors and gases produced in the cracking of hydrocarbon oil, which comprises partially condensing said mixture to form a heavy gasoline condensate, subjecting the remaining vapors and gases to further condensation and separating the resultant light gasoline condensate from uncondensed gases, stabilizing said light condensate to liberate entrained and dissolved normally gaseous products therefrom, scrubbing such liberated gaseous products and said uncondensed gases with said heavy gasoline condensate to absorb heavier gaseous components in the condensate, combining the thus enriched heavy gasoline condensate with said light gasoline condensate and stabilizing the resultant mixture to the vapor pressure of motor fuel.

4. The process as defined in claim 2 further characterized in that the combined condensates are stabilized independently of and under lower pressure than the light gasoline condensate formed by the second-mentioned condensation step.

5. The process as defined in claim 3 further characterized in that the combined condensates are stabilized independently of and under lower pressure than the light gasoline condensate formed by the second-mentioned condensation step.

LYMAN C. HUFF.